(12) United States Patent
Stuart et al.

(10) Patent No.: US 10,832,253 B2
(45) Date of Patent: *Nov. 10, 2020

(54) SELECTIVE PRESENTATION OF REAL-TIME CONTACT OPTIONS BASED ON USER AND SYSTEM PARAMETERS

(71) Applicant: eBay Inc., San Jose, CA (US)

(72) Inventors: Erik Anderson Stuart, San Mateo, CA (US); Brian Alan Grove, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,699

(22) Filed: Dec. 31, 2019

(65) Prior Publication Data

US 2020/0134634 A1    Apr. 30, 2020

Related U.S. Application Data

(63) Continuation of application No. 16/400,561, filed on May 1, 2019, now Pat. No. 10,546,301, which is a
(Continued)

(51) Int. Cl.
*G06Q 30/00* (2012.01)
*G06Q 30/06* (2012.01)

(52) U.S. Cl.
CPC ......... *G06Q 30/00* (2013.01); *G06Q 30/0601* (2013.01)

(58) Field of Classification Search
CPC ............... G06Q 30/02; G06Q 30/0273; G06Q 30/0254; G06Q 30/0257; G06Q 30/0251;
(Continued)

(56) References Cited

U.S. PATENT DOCUMENTS

| 5,630,117 A | 5/1997 | Oren et al. |
| 5,634,121 A | 5/1997 | Tracz et al. |

(Continued)

FOREIGN PATENT DOCUMENTS

| EP | 0926614 A2 | 6/1999 |
| EP | 0936796 A2 | 8/1999 |

(Continued)

OTHER PUBLICATIONS

Notice of Allowance received for U.S. Appl. No. 16/400,561, dated Sep. 18, 2019, 10 pages.
(Continued)

*Primary Examiner* — Phung-Hoang J Nguyen
(74) *Attorney, Agent, or Firm* — Schwegman Lundberg & Woessner, P.A.

(57) ABSTRACT

Embodiments for presenting real-time contact options are described herein. In example embodiments, as system identifies a number of user devices actively viewing a web page that includes a real-time contact option. The system then determines whether the number of user devices actively viewing the web page that includes the real-time contact option exceeds a predetermined limit. If the number of user devices actively viewing the web page that includes the real-time contact option exceeds the predetermined limit, the system prevents presentation, to a further user device, of the real-time contact option on the web page. Conversely, if the number of user devices actively viewing the web page that includes the real-time contact option does not exceed the predetermined limit, the system causes presentation of the web page with the real-time contact option to the further user device.

18 Claims, 5 Drawing Sheets

Related U.S. Application Data continuation of application No. 15/963,247, filed on Apr. 26, 2018, now Pat. No. 10,325,267, which is a continuation of application No. 15/626,932, filed on Jun. 19, 2017, now Pat. No. 9,978,069, which is a continuation of application No. 11/508,091, filed on Aug. 22, 2006, now Pat. No. 9,684,901.

(58) Field of Classification Search
CPC ... G06Q 20/12; G06Q 30/0601; H04M 15/00; H04L 29/06
See application file for complete search history.

(56) References Cited

U.S. PATENT DOCUMENTS

| | | | |
|---|---|---|---|
| 5,708,825 | A | 1/1998 | Sotomayor |
| 5,745,360 | A | 4/1998 | Leone et al. |
| 6,092,074 | A | 7/2000 | Rodkin et al. |
| 6,337,858 | B1 | 1/2002 | Petty et al. |
| 6,523,037 | B1 | 2/2003 | Monahan et al. |
| 6,546,399 | B1 | 4/2003 | Reed et al. |
| 6,570,870 | B1 | 5/2003 | Berstis |
| 6,651,058 | B1 | 11/2003 | Sundaresan et al. |
| 7,007,074 | B2 | 2/2006 | Radwin |
| 7,051,079 | B2 | 5/2006 | Tanaka et al. |
| 7,289,623 | B2 | 10/2007 | Lurie |
| 7,315,826 | B1 | 1/2008 | Guheen et al. |
| 9,684,901 | B2 | 6/2017 | Stuart et al. |
| 9,978,069 | B2 | 5/2018 | Stuart et al. |
| 10,325,267 | B2 | 6/2019 | Stuart et al. |
| 10,546,301 | B2 | 1/2020 | Stuart et al. |
| 2002/0016736 | A1 | 2/2002 | Cannon et al. |
| 2002/0143654 | A1 | 10/2002 | Wang et al. |
| 2002/0161667 | A1 | 10/2002 | Felkey et al. |
| 2003/0120779 | A1 | 6/2003 | Rodefer et al. |
| 2004/0068499 | A1 | 4/2004 | Adar et al. |
| 2004/0193488 | A1 | 9/2004 | Khoo et al. |
| 2004/0193525 | A1 | 9/2004 | Huang |
| 2005/0188007 | A1 | 8/2005 | Warner et al. |
| 2005/0198299 | A1 | 9/2005 | Beck et al. |
| 2006/0159063 | A1 | 7/2006 | Kumar |
| 2006/0167756 | A1 | 7/2006 | Vonbergen et al. |
| 2006/0168001 | A1 | 7/2006 | Lasater et al. |
| 2006/0168033 | A1* | 7/2006 | Cai ............... G06Q 10/107 709/206 |
| 2006/0239186 | A1 | 10/2006 | Wu |
| 2006/0265259 | A1 | 11/2006 | Diana et al. |
| 2006/0271425 | A1 | 11/2006 | Goodman et al. |
| 2006/0277108 | A1 | 12/2006 | Altberg et al. |
| 2007/0043651 | A1 | 2/2007 | Xiao et al. |
| 2007/0088603 | A1 | 4/2007 | Jouppi et al. |
| 2007/0100867 | A1 | 5/2007 | Celik et al. |
| 2007/0100956 | A1 | 5/2007 | Kumar |
| 2007/0140117 | A1 | 6/2007 | Zhou et al. |
| 2007/0143827 | A1 | 6/2007 | Nicodemus et al. |
| 2007/0165821 | A1* | 7/2007 | Altberg ............. H04L 29/06027 379/210.02 |
| 2007/0208630 | A1 | 9/2007 | Chatter et al. |
| 2007/0233562 | A1 | 10/2007 | Lidwell et al. |
| 2007/0271110 | A1 | 11/2007 | Van der linden et al. |
| 2008/0065501 | A1 | 3/2008 | Stuart et al. |
| 2008/0104073 | A1 | 5/2008 | Gorelick et al. |
| 2010/0226261 | A1* | 9/2010 | Piche ............... H04L 29/06027 370/252 |
| 2017/0286968 | A1 | 10/2017 | Stuart et al. |
| 2018/0247315 | A1 | 8/2018 | Stuart et al. |
| 2019/0259035 | A1 | 8/2019 | Stuart et al. |

FOREIGN PATENT DOCUMENTS

| | | |
|---|---|---|
| WO | 01/86390 A2 | 11/2001 |
| WO | 2001/086390 A2 | 11/2001 |
| WO | 2002/025401 A2 | 3/2002 |
| WO | 02/048828 A2 | 6/2002 |
| WO | 2007/033037 A2 | 3/2007 |
| WO | 2007/033037 A3 | 1/2008 |
| WO | 2008/024383 A2 | 2/2008 |
| WO | 2008/024383 A3 | 11/2008 |

OTHER PUBLICATIONS

Summons to Attend oral proceedings received for European patent application No. 07811463.4, mailed on May 30, 2012, 10 pages.
Communication Pursuant to Article 94(3) EPC for European Patent Application No. 06814399.9 dated Nov. 9, 2011, 2 pages.
Decision on Appeal received for European Patent Application No. 06814399.9, mailed on Apr. 5, 2017, 17 pages.
Extended European Search Report received for EP Patent Application No. 06814399.9 dated Sep. 15, 2010, 8 pages.
Grounds for Appeal filed on Apr. 29, 2014 for European Patent Application No. 06814399.9, 19 pages.
Oral Proceeding received for European Patent Application No. 06814399.9 mailed on Mar. 28, 2017, 7 pages.
Response to Communication Pursuant to Article 94(3) EPC filed on Mar. 15, 2012 for European Patent Application No. 06814399.9 dated Nov. 9, 2012, 9 pages.
Response to Search Report filed on Apr. 12, 2011 for European Patent Application No. 06814399.9, 15 pages.
Response to Summons to Attend Oral Proceedings filed on Oct. 2, 2013 for European Patent Application No. 06814399.9, mailed on Sep. 5, 2013, 35 pages.
Summons to Attend Oral Proceedings received for European Patent No. 06814399.9, mailed on Nov. 24, 2016, 12 pages.
Summons to Attend Oral Proceedings received for European Patent Application No. 06814399.9, mailed on Sep. 5, 2013, 9 pages.
Written decision to refuse received for European Patent Application No. 06814399.9, dated Dec. 20, 2013, 23 pages.
Communication Pursuant to Article 94(3) EPC for European Patent Application No. 07811463.4 dated Dec. 22, 2009, 8 pages.
Communication Pursuant to Article 94(3) EPC for European Patent Application No. 07811463.4 dated Nov. 15, 2011, 7 pages.
Extended European Search Report received for EP Patent Application No. 07811463.4 dated Sep. 28, 2009, 7 pages.
Response to Communication Pursuant to Article 94(3) EPC filed on Apr. 30, 2010 for European Patent Application No. 07811463.4 dated Dec. 22, 2009, 19 pages.
Response to Communication Pursuant to Article 94(3) EPC filed on Mar. 22, 2012 for European Patent Application No. 07811463.4 dated Nov. 15, 2011, 4 pages.
Advisory Action received for U.S. Appl. No. 11/508,091 dated Feb. 24, 2011, 3 pages.
Advisory Action received for U.S. Appl. No. 11/508,091 dated Mar. 1, 2010, 3 pages.
Advisory Action received for U.S. Appl. No. 11/508,091 dated Mar. 25, 2009, 3 pages.
Appeal Brief for U.S. Appl. No. 11/508,091, filed Nov. 19, 2012, 20 pages.
Appeal Decision received for U.S. Appl. No. 11/508,091 dated Sep. 10, 2015, 9 pages.
Decision on Pre-Appeal Brief Request received for U.S. Appl. No. 11/508,091 dated Mar. 29, 2011, 2 pages.
Decision on Pre-Appeal Brief Request received for U.S. Appl. No. 11/508,091 dated Sep. 18, 2012, 2 pages.
Examiner's Answer to Appeal Brief received for U.S. Appl. No. 11/508,091 dated Dec. 20, 2012, 15 pages.
Final Office Action received for U.S. Appl. No. 11/508,091, dated Feb. 22, 2012, 14 pages.
Final Office Action received for U.S. Appl. No. 11/508,091, dated Jan. 7, 2011, 10 pages.
Final Office Action received for U.S. Appl. No. 11/508,091, dated Jan. 12, 2009, 11 pages.
Final Office Action received for U.S. Appl. No. 11/508,091, dated Jun. 29, 2012, 16 pages.
Final Office Action received for U.S. Appl. No. 11/508,091, dated Dec. 16, 2009, 13 pages.

(56) References Cited

OTHER PUBLICATIONS

Non-Final Office Action received for U.S. Appl. No. 11/508,091, dated Aug. 11, 2008, 9 pages.
Non-Final Office Action received for U.S. Appl. No. 11/508,091, dated Jan. 25, 2017, 11 pages.
Non-Final Office Action received for U.S. Appl. No. 11/508,091, dated Jun. 17, 2010, 10 pages.
Non-Final Office Action received for U.S. Appl. No. 11/508,091, dated Jun. 18, 2009, 9 pages.
Non-Final Office Action received for U.S. Appl. No. 11/508,091, dated Mar. 22, 2012, 12 pages.
Non-Final Office Action received for U.S. Appl. No. 11/508,091, dated May 6, 2011, 9 pages.
Non-Final Office Action received for U.S. Appl. No. 11/508,091, dated Oct. 20, 2011, 11 pages.
Notice of Allowance Received for U.S. Appl. No. 11/508,091, dated Feb. 22, 2017, 5 pages.
Pre-Appeal Brief Request filed for U.S. Appl. No. 11/508,091, mailed on Jul. 18, 2012, 5 pages.
Pre-Appeal Brief Request filed for U.S. Appl. No. 11/508,091, mailed on Mar. 2, 2011, 5 pages.
Response to Final Office Action filed on Feb. 3, 2011, for U.S. Appl. No. 11/508,091, dated Jan. 7, 2011, 12 pages.
Response to Final Office Action filed on Feb. 16, 2010 for U.S. Appl. No. 11/508,091 dated Dec. 16, 2009, 13 pages.
Response to Final Office Action filed on Mar. 7, 2012 for U.S. Appl. No. 11/508,091 dated Feb. 22, 2012, 14 pages.
Response to Final Office Action filed on Mar. 12, 2009, for U.S. Appl. No. 11/508,091, dated Jan. 12, 2009, 11 pages.
Response to Final Office Action filed on May 17, 2010 for U.S. Appl. No. 11/508,091 dated Dec. 16, 2009, 13 pages.
Response to Non-Final Office Action filed on Aug. 8, 2011 for U.S. Appl. No. 11/508,091 dated May 6, 2011, 12 pages.
Response to Non-Final Office Action filed on Feb. 10, 2017 for U.S. Appl. No. 11/508,091 dated Jan. 25, 2017, 9 pages.
Response to Non-Final Office Action filed on Jan. 16, 2012 for U.S. Appl. No. 11/508,091 dated Oct. 20, 2011, 12 pages.
Response to Non-Final Office Action filed on May 22, 2012 for U.S. Appl. No. 11/508,091 dated Mar. 22, 2012, 11 pages.
Response to Non-Final Office Action filed on Nov. 4, 2008 for U.S. Appl. No. 11/508,091 dated Aug. 11, 2008, 16 pages.
Response to Non-Final Office Action filed on Oct. 18, 2010 for U.S. Appl. No. 11/508,091 dated Jun. 17, 2010, 12 pages.
Response to Non-Final Office Action filed on Sep. 17, 2009 for U.S. Appl. No. 11/508,091 dated Jun. 18, 2009, 11 pages.
Advisory Action received for U.S. Appl. No. 11/518,667 dated Jul. 13, 2010, 3 pages.
Decision on Pre-Appeal Brief for U.S. Appl. No. 11/518,667 mailed on Sep. 20, 2010, 2 pages.
Examiner Interview Summary received for U.S. Appl. No. 11/518,667, dated Aug. 12, 2015, 3 pages.
Examiner Interview Summary received for U.S. Appl. No. 11/518,667, dated Dec. 24, 2015, 3 pages.
Examiner Interview Summary received for U.S. Appl. No. 11/518,667, dated Oct. 31, 2014, 3 pages.
Final Office Action received for U.S. Appl. No. 11/518,667, dated Feb. 2, 2010, 15 pages.
Final Office Action received for U.S. Appl. No. 11/518,667, dated Aug. 30, 2013, 16 pages.
Final Office Action received for U.S. Appl. No. 11/518,667, dated Nov. 6, 2015, 20 pages.
Final Office Action received for U.S. Appl. No. 11/518,667, dated Sep. 11, 2014, 18 pages.
Non-Final Office Action received for U.S. Appl. No. 11/518,667, dated Apr. 10, 2014, 19 pages.
Non-Final Office Action received for U.S. Appl. No. 11/518,667, dated Apr. 10, 2015, 20 pages.
Non-Final Office Action received for U.S. Appl. No. 11/518,667, dated Aug. 19, 2016, 23 pages.
Non-Final Office Action received for U.S. Appl. No. 11/518,667, dated Jan. 25, 2013, 15 pages.
Non-Final Office Action received for U.S. Appl. No. 11/518,667, dated Jul. 2, 2009, 14 pages.
Pre-Appeal Brief Request for U.S. Appl. No. 11/518,667 filed on Aug. 2, 2010, 5 pages.
Response to Final Office Action filed on Apr. 1, 2010, for U.S. Appl. No. 11/518,667, dated Feb. 2, 2010, 12 pages.
Response to Final Office Action filed on Dec. 9, 2014 for U.S. Appl. No. 11/518,667 dated Sep. 11, 2014, 17 pages.
Response to Final Office Action filed on Mar. 7, 2016 for U.S. Appl. No. 11/518,667 dated Nov. 6, 2015, 23 pages.
Response to Final Office Action filed on Oct. 30, 2013 for U.S. Appl. No. 11/518,667 dated Aug. 30, 2013, 15 pages.
Response to Non-Final Office Action filed on Apr. 25, 2013 for U.S. Appl. No. 11/518,667 dated Jan. 25, 2013, 14 pages.
Response to Non-Final Office Action filed on Aug. 10, 2015, for U.S. Appl. No. 11/518,667, dated Apr. 10, 2015, 31 pages.
Response to Non-Final Office Action filed on Jul. 10, 2014 for U.S. Appl. No. 11/518,667 dated Apr. 10, 2014, 16 pages.
Response to Non-Final Office Action filed on Oct. 2, 2009 for U.S. Appl. No. 11/518,667 dated Jul. 2, 2009, 13 pages.
Applicant Initiated Interview Summary received for U.S. Appl. No. 15/626,932, dated Jan. 22, 2018, 2 pages.
First Action Interview—Office Action Summary received for U.S. Appl. No. 15/626,932, dated Oct. 13, 2017, 4 pages.
Notice of Allowance received for U.S. Appl. No. 15/626,932, dated Jan. 22, 2018, 15 pages.
Preliminary Amendment filed for U.S. Appl. No. 15/626,932, dated Jun. 28, 2017, 7 pages.
Response to First Action Interview filed on Dec. 6, 2017 for U.S. Appl. No. 15/626,932 dated Oct. 13, 2017, 2 pages.
Non-Final Office Action received for U.S. Appl. No. 15/963,247, dated Jul. 25, 2018, 21 pages.
Notice of Allowance received for U.S. Appl. No. 15/963,247, dated Jan. 25, 2019, 14 pages.
Response to Non-Final Office Action filed on Oct. 25, 2018, for U.S. Appl. No. 15/963,247, dated Jul. 25, 2018, 14 pages.
Waterman, "Yellow Pages on CD-Rom: A Survey of Three Contemporary Products", Jan. 9, 1993, 6 pages.
Blount, "Talking Yellow Pages. Buyers in 20 Cities Now Let Their Fingers Do the Talking Through Automated Telephone Advertising Message Systems", Oct. 1, 1987, 40 pages.
Broida, Rick, "Secrets of Online Power Shopping: -Etailers offercool tools to help you shop better, smarter, and more often", Computer Shopper, v 21, e 11, downloaded from Dialog Web, Mar. 21, 2011, 7 pages.
Desmarais, "Gold Turns to Silver: Yellow Pages on CD-Rom", Mar. 1, 1992, pp. 21-27.
Eriksson, "Internet Directory Services with Click-to-Talk", Teiefonaktiebolaget, vol. 75, No. 3, Jan. 1, 1998, pp. 118-125.
Hu, "Automatic Reading of the White Pages in a Telephone Directory", Nov. 1, 1996, pp. 3150-3158.
Kanada, Y., "Axis-specified Search: A Fine-grained Full-text Search Method for Gathering and Structing Excerpts", Proceedings of the third ACM Conference on Digital Libraries, May 1998, pp. 108-117.
Marshall, Matt, "Gee-whiz Web firms sprouting like it's 99", Mercury News—San Jose, Oct. 6, 2005, pp. 1-2.
Minoru, et al., "An Intelligent Yellow Pages Assistance System", Jan. 1, 1989, pp. 57-62.
International Preliminary Report on Patentability received for PCT Application No. PCT/US2006/035187, dated Mar. 27, 2008, 7 pages.
International Search Report received for PCT Patent Application No. PCT/US2006/035187, dated Nov. 27, 2007, 2 pages.
International Written Opinion Received for PCT Application No. PCT/US2006/035187 dated Nov. 27, 2007, 5 pages.
International Preliminary Report on Patentability received for PCT Application No. PCT/US2007/018538, dated Feb. 24, 2009, 4 pages.
International Search Report received for PCT Patent Application No. PCT/US2007/018538, dated Sep. 11, 2008, 2 pages.

(56) References Cited

OTHER PUBLICATIONS

International Written Opinion received for PCT Application No. PCT/US2007/018538, dated Sep. 11, 2008, 3 pages.
U.S. Appl. No. 16/400,561, filed May 1, 2019, Patented.
U.S. Appl. No. 15/963,247, filed Apr. 26, 2018, Patented.
U.S. Appl. No. 15/626,932, filed Jun. 19, 2017, Patented.
U.S. Appl. No. 11/508,091, filed Aug. 22, 2006, Patented.
U.S. Appl. No. 11/518,667, filed Sep. 11, 2006, Methods and Systems to Enhance Publication Information With a Communication Feature.
U.S. Appl. No. 15/626,932, U.S. Pat. No. 9,978,069, filed Jun. 19, 2017, Selective Presentation of Real-Time Contact Options Based on User and System Parameters.
U.S. Appl. No. 11/508,091, U.S. Pat. No. 9,684,901, filed Aug. 22, 2006, Selective Presentation of Real-Time Contact Options Based on User and System Parameters.
U.S. Appl. No. 15/963,247, U.S. Pat. No. 10,325,267, filed Apr. 26, 2018, Selective Presentation of Real-Time Contact Options Based on User and System Parameters.
U.S. Appl. No. 16/400,561, U.S. Pat. No. 10,546,301, filed May 1, 2019, Selective Presentation of Real-Time Contact Options Based on User and System Parameters.

\* cited by examiner

SELECTIVE PRESENTATION OF REAL-TIME CONTACT OPTIONS BASED ON USER AND SYSTEM PARAMETERS

PRIORITY

This application is a continuation of U.S. patent application Ser. No. 16/400,561, filed May 1, 2019, which is a continuation of U.S. patent application Ser. No. 15/963,247, filed Apr. 26, 2018, which is a continuation of U.S. patent application Ser. No. 15/626,932, filed Jun. 19, 2017, which claims the benefit of priority to U.S. patent application Ser. No. 11/508,091, filed on Aug. 22, 2006, which is hereby incorporated by reference herein in its entirety.

TECHNICAL FIELD

Various embodiments described herein relate generally to publication server systems (ES), including apparatus, systems, and methods used in product or service sales publication servers.

BACKGROUND INFORMATION

A publication server may act as an interface between one or more sellers offering goods or services for purchase or bid. A seller may provide product or service information, pricing information, and contact information to a publication server via a seller interface. The publication server may generate an electronic representation of the sellers' product or service offering where a buyer may be able to view the representations via an electronic interface.

In order to expedite sales or inspire conference in a seller's product or service, a publication server may enable a potential buyer to request additional information about a seller's representation or listing via the buyer interface.

DETAILED DESCRIPTION

Figure 1:
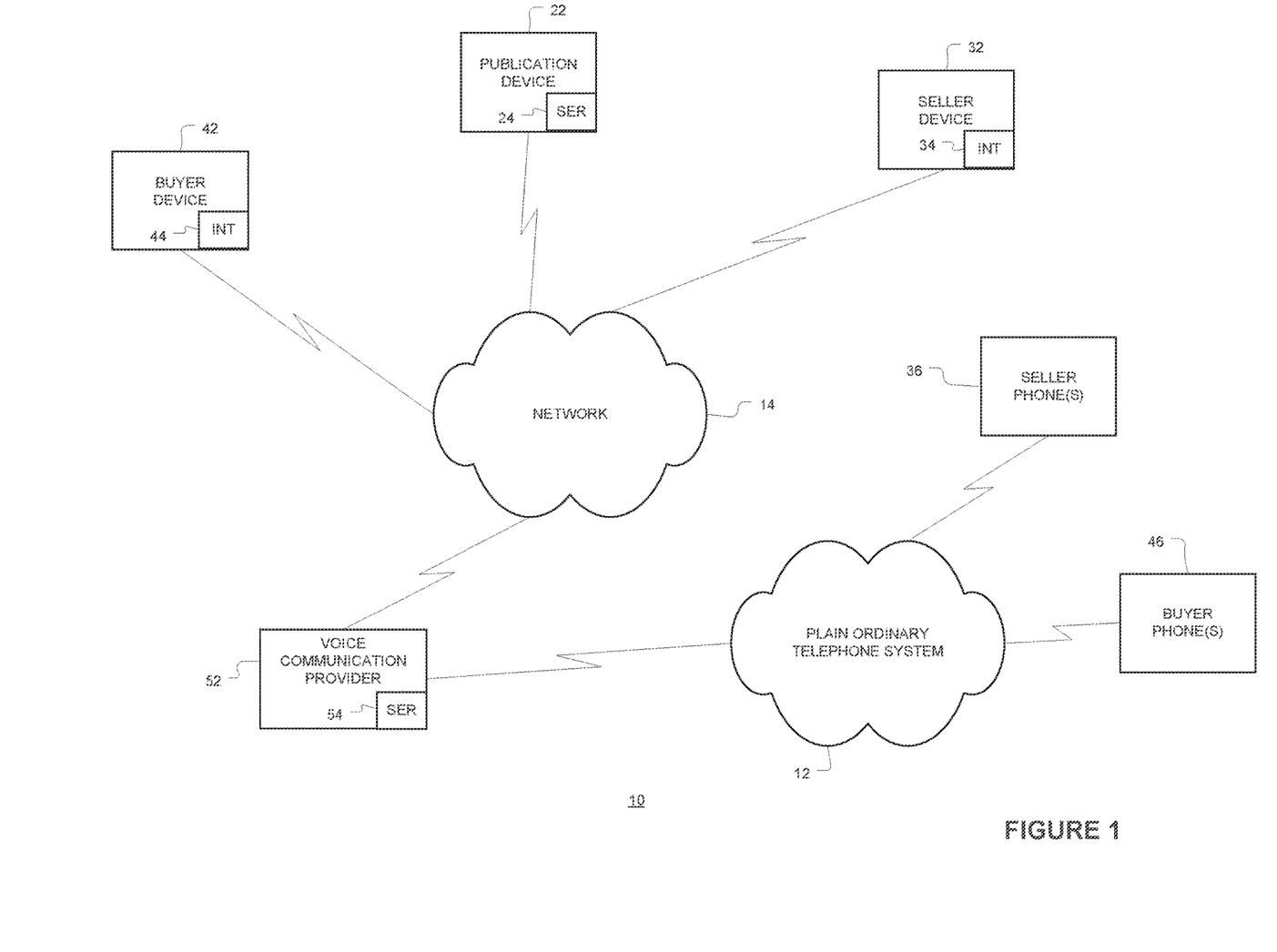
FIG. 1 is a block diagram of product or service publication server architecture according to various embodiments.

FIG. 1 is a block diagram of a product or service publication server architecture 10 comprising a buyer device (BD) 42, publication device (PD) 22, and seller device (SD) 32, according to various embodiments. The buyer device 42 may be coupled to the publication device 22 via a network 14 where the network may be a local wired or wireless network or a network of networks such as the Internet. The seller device 32 may also be coupled to the publication device 22 via the network 14 where the network may be a local wired or wireless network or a network of networks such as the Internet. The seller device 32 may be part of the publication device 22 where the publisher is also the seller.

The publication device 22 includes a server 24 where the server 24 may be configured to communicate messages between the buyer device 42 and the publication device 22. The server 24 may also be configured to communicate messages between the publication device 22 and the seller device 32. The seller device 32 may have an interface 34 that may be configured to communicate messages between the publication device 22 and itself. In an embodiment, a buyer device 42 may have an interface 44 that may be configured to communicate messages between the publication device 22 and itself. The interfaces 34 and 44 may each include a hyper-text markup language (HTML) converter such as a browser and the server 24 may communicate messages between the publication device 22 and buyer device 42 and seller device 32 via one or more web pages.

The architecture 10 may include a voice communication provider (VCP) 52 that is coupled to the network 14. The voice communication provider 52 may include a Voice over Internet Protocol (VoIP) server 54. The publication device 22 may enable the voice communication provider 52 to establish voice communication between the buyer device 42 and seller device 32. The voice communication provider 52 may establish VoIP communication between the seller device 32 and buyer device 42. The interface 44 or interface 34 may be able to establish VoIP sessions via a browser, a thin client, or a VoIP application specific program (ASP). The publication device 22 server 24 may include a VoIP server.

The publication device 22 may establish VoIP communication between a seller device 32 and buyer device 42 by providing peer-to-peer connection information for both devices 32, 42. The seller device 32 and buyer device 42 may form a peer-to-peer connection that enables voice or other real-time communication between the devices 32, 42. The seller device 32 and buyer device 42 may act as effective client and servers in peer-to-peer connections and may be responsible for terminating such sessions via peer-to-peer software or protocols. The seller device 32 and buyer device 42 may host a communication client to support peer-to-peer connections and an access client for browser based communication.

The architecture 10 may also include plain-old-telephone-system (POTS) 12 coupled to the voice communication provider 52. In an embodiment a seller may have one or more phones 36 coupled to the POTS 12 (including cellular phones). The seller device 32 may specify one or more phone numbers associated with the seller phone(s) 36 where publication device 22 initiated voice communication may be to be directed. In an embodiment a buyer may have one or more phones 46 coupled to the POTS 12 (including cellular phones). The buyer device 42 may specify one or more phone numbers associated with the buyer phone(s) 46 where publication device 22 initiated voice communication may to be directed. The publication device 22 may employ the voice communication provider 52 to establish communication between any combination of a buyer device 42, a seller device 32, a seller phone 36, and buyer phone 46.

The buyer device 42 may be any computer device capable of providing an interface 44 including a computer, personal data assistant, or web enabled cellular phone. The buyer device 42 may be able to establish VoIP sessions including peer-to-peer sessions via a client or receive calls via a telephone number. The seller device 32 may be any computer device capable of providing an interface 34 including a computer, personal data assistant, or web enabled cellular phone. The buyer device 42 may be able to establish VoIP sessions or receive calls via a telephone number.

Figure 2:
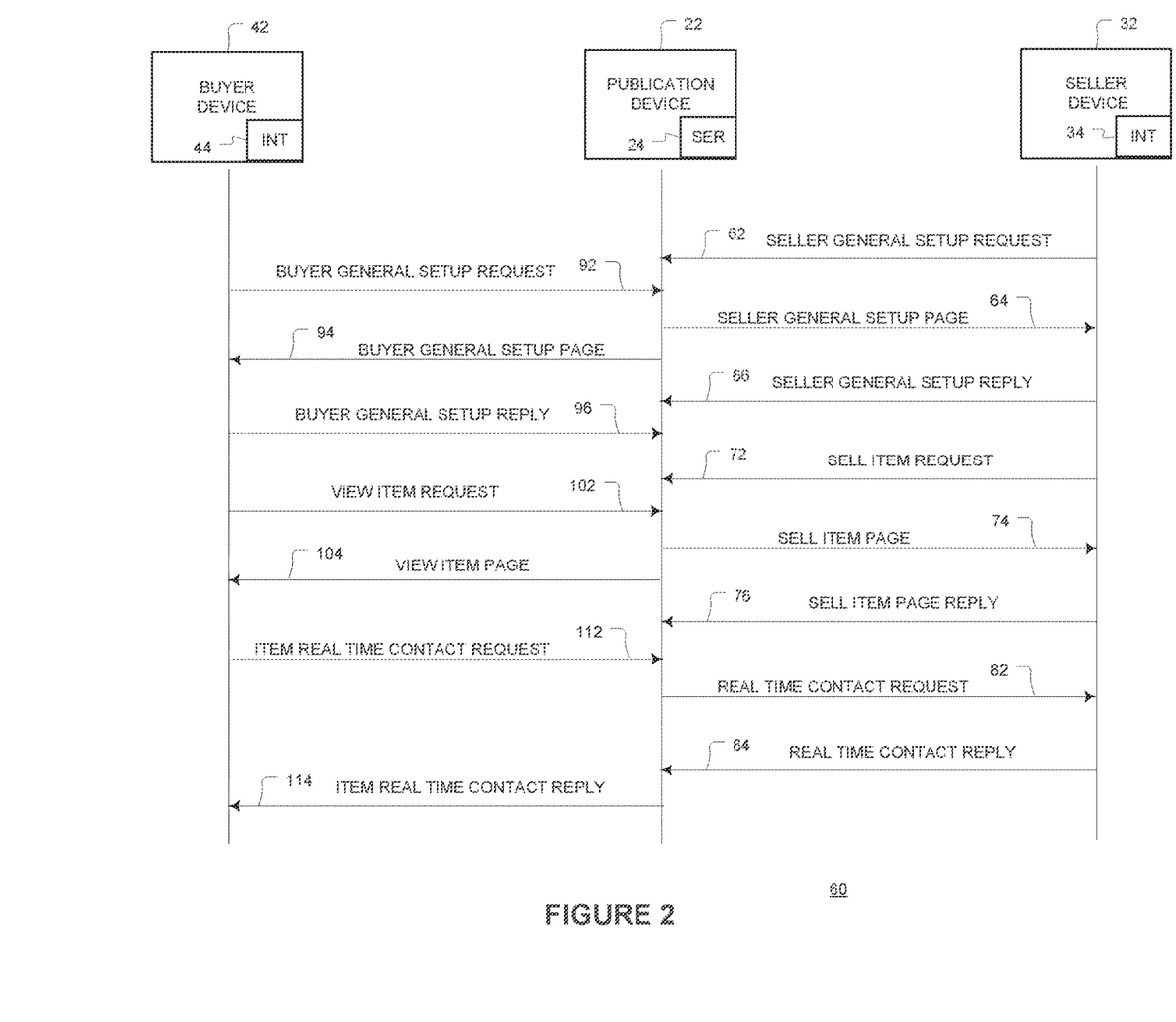
FIG. 2 is a diagram of communication between a buyer device, publication device, and seller device in a product or service publication server architecture according to various embodiments.

FIG. 2 is a diagram of communications 40 between a publication device 22 and a buyer device 42 and between the publication device 32 and a seller device 32 according to various embodiments. In an embodiment, a seller may have products or services for sale or bid. The seller via a seller device 32 may engage a publication device 22 to generate an electronic catalog or listing(s) of the sellers' products or services for sale or bid. A buyer via a buyer device 42 may view the electronic catalog or listing(s) and purchase, offer to purchase, or bid on one or more products or services shown in the electronic catalog or listing(s). In an embodiment a seller via a seller device 32 may register or setup an account or services with the publication device 22. A seller via a seller device 32 may generate a seller general setup request 62. In an embodiment a seller may employ the interface 34 to generate the request 62 via a web page provided by the publication device 22 server 24.

In response to the seller general setup request 62, the publication device 22 may generate a seller general setup page 64 and provide it to the seller device 32 as an HTML document, may for example. The setup page 64 may enable a seller to set numerous preferences, account information, and contact information. In an embodiment, the preferences may include the ability of a buyer or potential buyer to contact the seller via real-time communication. The real-time communication preferences may include the seller's availability schedule (based on the seller's time zone), the seller's spoken and written languages, seller's desire to have an interpreter participate in a voice or text call for certain other languages, one or more contact numbers or VoIP identifiers to be used according to a schedule or product or service. The real-time communication preferences may also include a list of buyers (by identifier or other unique reference) that are excluded or permitted to communicate with the seller via voice communication, required related product or service sale status including requirements that a buyer has offered to buy, purchased, bid, or placed a bid meeting a predetermined minimum or reserve, or has a certain buyer history or rating as established by the publication device 22 server 24.

The seller device 32 may forward the seller general setup reply 66 to the publication device 22 server 24. In an embodiment, the publication device 22 may store the seller information and preferences in one or more databases. A potential buyer or buyer via a buyer device 42 may generate a buyer general setup request 92. A buyer or potential buyer may employ the interface 44 to generate the request 92 via a web page provided by the publication device 22 server 24. A buyer device 42 may be able to communicate with the publication device 22 without registration or unique identification. In another embodiment, a buyer via a buyer device 42 may have the option of registering or providing a unique identifier when communicating with the publication device 22.

In response to the buyer general setup request 92, the publication device 22 may generate a buyer general setup page 94 and provide it to the buyer device 42 as an HTML document. The buyer general setup page 94 may enable a potential buyer to set numerous preferences, account information, and contact information. The preferences may include real-time communication preferences. In an embodiment, buyer real-time communication preferences may include the buyer's availability schedule (for receipt of seller's communication requests to the buyer), the buyer's spoken or written languages, buyer's desire to have an interpreter participate in a voice or text calls for certain other languages, one or more contact numbers or VoIP identifiers to be used according to a schedule or product or service. The real-time communication preferences may also include a list of sellers (by identifier or other unique reference) that are excluded or permitted to communicate with the buyer via voice communication, required related product or service sale status including whether the buyer has offered to buy, purchased, bid, or placed a bid meeting a predetermined minimum or reserve, and the seller's history or rating as established by the publication device 22 server 24.

The buyer device 42 may forward the buyer general setup reply 96 to the publication device 22 server 24. In an embodiment, the publication device 22 may store the buyer information and preferences in one or more databases. A seller via a seller device 32 may create a catalog or listing of one or more products or services offerings (items in an embodiment) by generating a sell item request 72. In an embodiment a seller may select an option to generate a sell item request 72 via a seller device 32 from a web page generated by the publication device 22. A seller may receive a sell item page 74 from the publication device 22 server 24 and populate the page via the seller device 32 interface 34. The seller may be able to specify item information including description, reserve, multimedia (including pictures, or videos), links to other information or multimedia, and buyer real-time contact preferences for the particular listing.

Upon completion of the sell item page 74, a seller via the seller device 32 interface 34 may forward the completed page 74 via a sell item page reply 76. A buyer via a buyer device 42 interface 44 may generate a view item request 102. The buyer via a buyer device 42 interface 44 may perform a search for items (e.g., products or services offered) using a number of criteria including item description, multimedia matching, item geographical location, particular seller, ability to potentially contact seller via real-time communication with questions about an item, or pricing. The view item request 102 may be generated by a buyer selecting an item located in a search in an embodiment. The publication device 22 server 24 may generate a view item page 104 for the view item request 102 and forward the view item page 104 to the buyer via the buyer device 42 interface 44. The publication device 22 server 24 may retrieve information about the requested item from one or more databases when compiling a view item page 104. The view item page 104 may include a real-time contact icon (or some other user-selectable indicia) that a buyer may select via the buyer device 42 interface 44 to contact a seller via a real-time communication method, apparatus, or protocol including via voice, instant message, or other instant contact method or apparatus.

The publication device 22 may apply general rules, seller preferences, and buyer preferences to determine what, if any, contact icons may be included on the view item page 104 where the general rules, seller preferences, and buyer preferences may be stored in one or more databases accessible by the server 24. The publication device 22 server 24 may apply general rules for buyer-seller real-time communications including the number of real-time communications sessions conducted or attempted by a buyer or seller in a predetermined time period via the publication device 22, geographical attributes of the buyer or seller, the number of buyers already shown a contact icon for the seller and likelihood of one or more such buyers to attempt to contact the seller via the real-time contact icon, or unique identification of buyer (e.g., buyer logged into the publication device 22 server 24 in an embodiment).

A buyer receiving a view item page 104 with a seller real-time contact option (SRO) may select the real-time contact option icon and generate an item real-time contact request 112. The publication device 22 server 24 upon detecting the real-time contact option icon selection or receipt of the item real-time contact request may generate a real-time contact request page 82 for the seller device 32. The seller real-time contact request 82 may include an icon (or some other user-selectable indicia) for accepting the buyer real-time contact request. The page 82 may include a unique buyer identifier, information about the item(s) shown on the view item page 104 including description, item sales status in general and particular to the buyer, past interactions with the buyer including sales, contacts, or buyer language(s). The item sales status may include the number of items in inventory, number of orders in predetermined time frame, offers, offers exceeding a preset reserve, buyer's current offer for item (if any).

In an embodiment, a seller via a seller device 32 interface 34 may accept a real-time communication request 82 by selecting an acceptance icon on a web page presenting the real-time communication request 82. The seller via a seller device 32 interface 34 may decline a real-time communication request 82 by selecting a declination icon on a web page presenting the real-time communication request 82. If a seller accepts or declines the request 82, the seller device 32 interface 34 may generate a real-time contact reply 84. The publication device 22 server 24 upon receipt of the real-time contact reply 84 (e.g., selection of the acceptance or declination icon on a web page in an embodiment) may generate an item real-time contact reply 114 and forward the reply 114 to a buyer device 42 interface 44. The publication device 22 may generate a declination reply if a seller via a seller device 32 interface 34 does not respond within a predetermined time period. The publication device 22 server may store the real-time communication requests and responses in one or more databases.

When a seller via a seller device 32 interface 34 accepts a real-time communication request 82, the publication device 22 server 24 may initiate or request initiation of the requested real-time communication. In an embodiment, when the real-time communication request is a voice communication request, the publication device 22 server 24 may forward contact information for the buyer and seller to a voice communication provider 52. The voice communication provider 22 may attempt to initiate the requested communication based on the received contact information. In an embodiment, the voice communication provider server 54 may create a VoIP session between one of a buyer device 42 and buyer phone 46 and one of a seller device 32 and seller phone 36. The voice communication provider 52 may forward voice communication to a POTS 12 for communication with a buyer phone 46 or seller phone 36. The provider 52 may provide connection information to the seller device 32 and buyer device 42 that enables communication clients in each device 32, 42 to establish peer-to-peer voice communication. The voice communication provider 52 server 54 may be a VoIP provider such as Skype™ or may employ a VoIP provider such as Skype™ to form VoIP sessions. The seller device 32 and buyer device 42 may employ Skype™ clients to enable peer-to-peer voice communication based on connection information provided by the publication device 22 or VCP 54.

The publication device 22 server 24 may determine contact information for the buyer and seller based on their communication preferences, including VoIP unique identifiers or telephone number(s) for the buyer and seller for voice communication sessions. The publication device 22 server 24 may provide the buyer's and seller's VoIP unique identifiers (for peer-to-peer sessions in an embodiment) or telephone number(s) to the voice communication provider 52 for voice communication requests. A buyer or seller may be able to end a communication session via a buyer device 42 interface 44, a buyer phone 46, a seller device 32 interface 34, or a seller phone 36. The publication device 22 server 24 may limit communication sessions to a predetermined time period.

Figure 3:
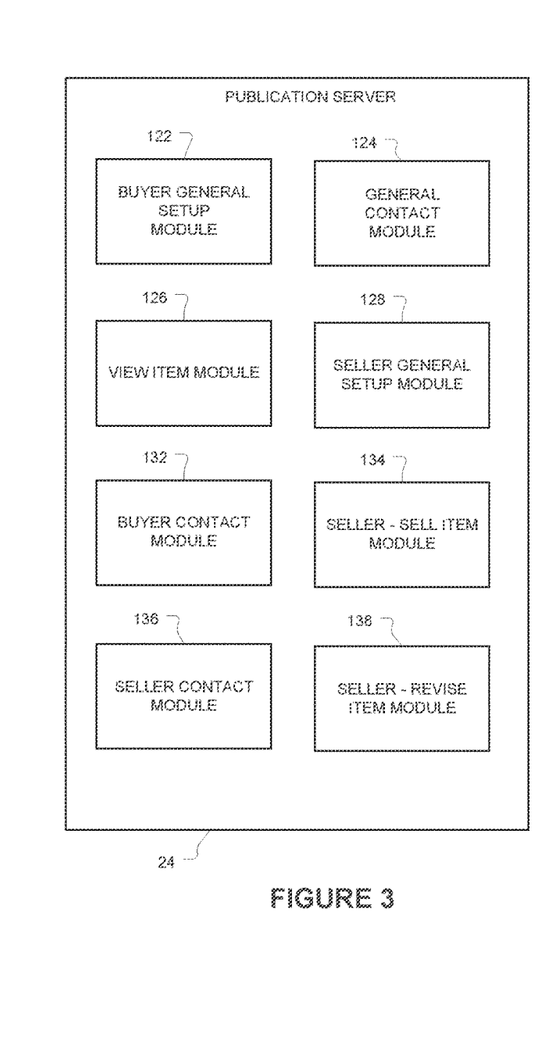
FIG. 3 is a block diagram of product or service publication server according to various embodiments.

In an embodiment, the publication device 22 server 24 may include a number of modules such as shown in FIG. 3 including a buyer general setup module 122, general contact module 124, view item module 126, seller general setup module 128, buyer contact module 132, seller—sell item module 134, seller contact module 136, and seller—revise item module 138. In an embodiment, the buyer general setup module 122 may enable a buyer via a buyer device 42 interface 44 to configure or modify general buyer information including buyer contact information including voice contact information. The module 122 may process buyer general setup requests 92 and replies 96 and generate buyer general setup pages 94. In an embodiment, the seller general setup module 128 may enable a seller via a seller device 32 interface 34 to configure or modify general seller information including seller contact information including voice contact information. The module 128 may process seller general setup requests 62 and replies 66 and generate seller general setup pages 64.

The general contact module 124 may enable an agent or agent administrator to configure or modify general contact rules including voice session rules related to buyers and sellers. In an embodiment, the view item module 126 may enable a buyer via a buyer device 42 interface 44 to view requested item information including potential real-time seller contact options. The view item module 126 may process view item requests 102 and generate view item pages 104. The seller-sell item module 134 may enable a seller via a seller device 32 interface 34 to configure information for items for sale or bid including potential real-time seller contact options. The seller-sell item module 134 may process sell item requests 72 and replies 76 and generate sell item pages 74.

In an embodiment, the seller revise item module 138 may enable a seller via a seller device 32 interface 34 to revise or modify item information including real-time seller contact options. The buyer contact module 132 may enable a buyer via a buyer device 42 interface 44 to request or end real-time communication with a seller. The buyer contact module 132 may process item real-time contact requests 112 and generate item real-time replies 114. In an embodiment, the seller contact module 136 may enable a seller via a seller device 32 interface 34 to reply to real-time communication requests or end real-time communication with a buyer. The seller contact module 136 may process item real-time contact replies 82 and generate item real-time requests 84.

Figure 4:
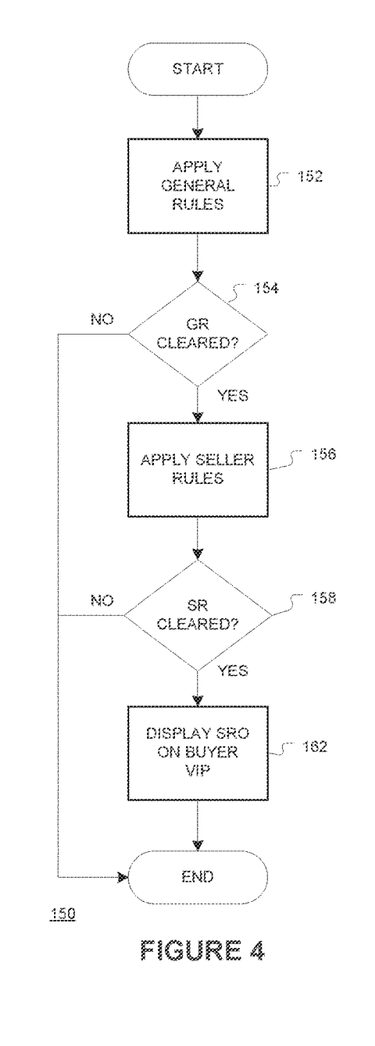
FIG. 4 is a flow diagram illustrating several methods according to various embodiments.

FIG. 4 is a flow diagram of a seller real-time-contact option activation method 150 according to various embodiments. The method 150 may apply general contact rules to determine whether any general rule is flagged or may be violated by presenting a real-time contact option on a view item page requested by a buyer via a buyer device 42 interface 44 (activity 152). When a general rule is flagged (due to the item requested, buyer (if known), or seller), a real-time contact option may not be presented on a view item page in an embodiment (activity 154). In an embodiment, the method 150 may apply seller contact rules to determine whether any seller rule is flagged or may be violated by presenting a real-time contact option on a view item page requested by a buyer via a buyer device 42 interface 44 (activity 156).

When a seller rule is flagged (due to the item requested, or buyer (if known)), a real-time contact option on a view item page may not be displayed in an embodiment (activity 158). In an embodiment, when the general contact rules and the seller contact rules have been cleared (e.g., no flag(s) set or rule potentially violated by possible presentation of a seller real-time contact option), the method 150 may enable real-time contact option presentation on a buyer view item page (VIP) (activity 162). A view item page may present a seller real-time-contact option for different real-time communication methods, apparatus, or protocols including voice, instant message, or other instant contact method, apparatus, or protocol. The method 150 may be employed to separately determine whether to present a real-time-contact option for each seller real-time-contact option where each option may have different general rules or seller rules.

Figure 5:
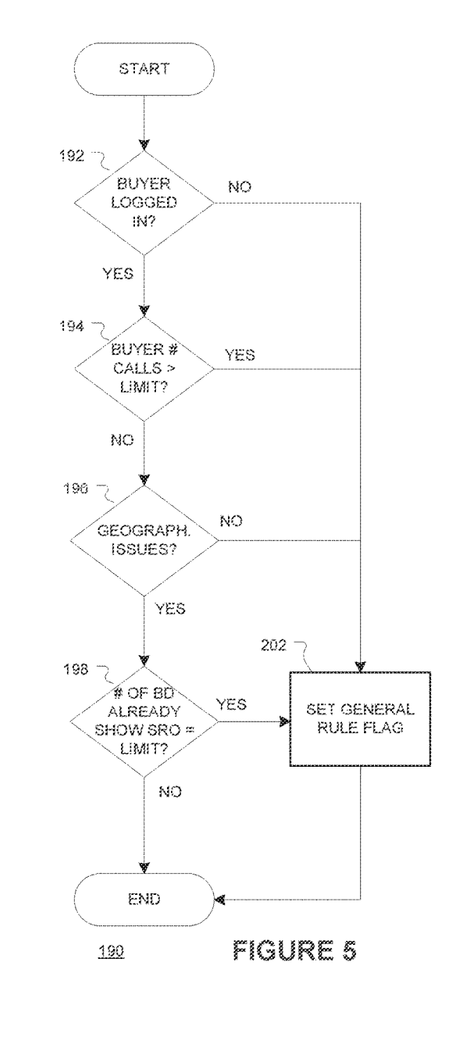
FIG. 5 is a flow diagram illustrating several methods according to various embodiments.

FIG. 5 is a flow diagram of a general contact rule evaluation method 190 according to various embodiments. In the general contact rule evaluation method 190, a number of general contact rules may be evaluated to determine whether a real-time contact option should be presented to a buyer. In an embodiment, the method 190 may determine whether a buyer (to possibly be shown a seller real-time contact option) is currently logged into the publication device 22 via the buyer device 42. In an embodiment a buyer may remain logged into a publication device 22 via buyer device 42 for a predetermined time interval. In another embodiment, the publication device 22 may determine whether a unique buyer is known based on the buyer device 32 coupled to the publication device 22 (such as via a cookie in some Internet browser applications). In an embodiment, when a buyer is not logged into the publication device 22 or cannot be uniquely identified (activity 192), the method 190 may set a general contact rule flag (activity 202).

In an embodiment, the method 190 may determine whether the buyer to possibly be shown a real-time contact option has exceeded a predetermined number of real-time contacts (activity 194) in a predetermined time interval. The predetermined number may vary as a function the real-time contact type, e.g., voice or instant message. The predetermined time interval may also be based on a calendar day, week, month, year, or some other predetermined time interval. In an embodiment, when a buyer has exceeded a predetermined number of real-time contacts within a predetermined time interval (activity 194), the method 190 may set a general contact rule flag (activity 202).

In an embodiment, the method 190 may determine whether any geographical or demographical issues may exist between the buyer and seller. The publication device 22 may employ a number of servers 24 where the servers 24 are geographical based such as for different countries or continents. The method 190 may limit potential voice sessions to buyers and sellers on the same server, within the same country or continent. In an embodiment, the method 190 may determine whether the item to be viewed by a buyer has potential export issues (to the buyer country or from the seller country). If export issues potentially exist, geographical issues exist, or demographical issues exist, the method 190 may set a general contact rule flag (activity 202).

In an embodiment, the method 190 may determine the number of buyer devices 42 actively viewing an item page that includes a real-time contact option icon (activity 198). When the buyer device active real-time contact option icon count number exceeds a predetermined limit including a maximum system limit, a seller limit, and a specific item limit, the method 190 may set a general contact rule flag (activity 202). The publication device 22 may employ a database or queue to monitor each real-time contact option currently shown on an item page. The method 190 may accumulate totals for the system (publication device 22), specific seller(s), or specific items. The method 190 may then determine whether to present an real-time contact option for a specific item based on the accumulated totals. The predetermined real-time contact option limit may be set as a function of past system activity, seller activity, item activity, probably of buyer(s) selecting a shown real-time contact option icon, and other related statistics.

Figure 6:
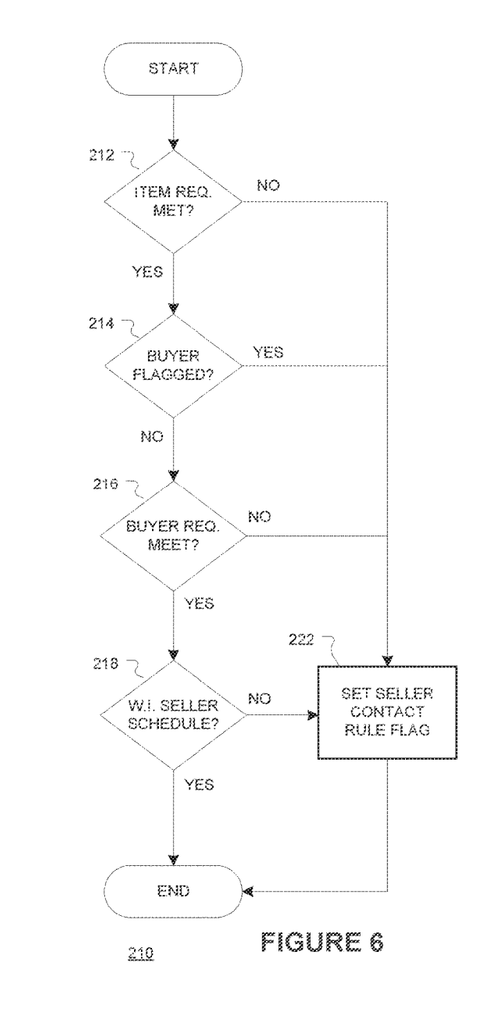
FIG. 6 is a flow diagram illustrating several methods according to various embodiments.

FIG. 6 is a flow diagram of a seller contact rule evaluation method 210 according to various embodiments. In the seller contact rule evaluation method 210, a number of seller specific contact rules may be evaluated to determine whether a seller real-time contact option (seller real-time contact option) should be presented to a buyer. In an embodiment, a seller via a seller device 32 may set a number of real-time contact option rules via a seller general setup page 64 (FIG. 2). A seller may select or deselect real-time contact option rules and set associated parameters via the general setup page 64. A seller via a seller device 32 interface 34 may select or deselect item specific real-time contact option rules and set associated parameters via a sell item page 74.

In an embodiment, the method 210 may determine whether item specific requirements or rules (if any) have been met or satisfied (activity 212). When an item specific requirement or rule has not been met, the method 210 may set a seller contact rule flag (activity 222). The item specific rules may include the item sales status or item sales value. The method 210 may determine whether the buyer associated with the buyer device 42 has been flagged by the seller via the seller device 32 (activity 214). When a buyer associated with the buyer device 42 has been flagged by a seller via the seller device 32, the method 210 may set a seller contact rule flag (activity 222). A seller via the seller general setup page 64 may create a list of buyers that are permitted or not permitted to have real-time contact with the seller. The buyer exclude/include real-time contact option list may be maintained by the publication device 22 server 24.

The method 210 may determine whether buyer specific requirements or rules (if any) have been met or satisfied (activity 216). When a buyer specific requirement or rule has not been met, the method 210 may set a seller contact rule flag (activity 222). The buyer specific requirements or rules may include a certain level of buyer experience with one of a publication device 22 and the seller associated with the item page being requested. In an embodiment, the method 210 may determine whether the requested item page is to be shown within a seller's predefined real-time-contact schedule (activity 218). When the requested item page is to be shown outside the associated seller predefined real-time-contact schedule, the method 210 may set a seller contact rule flag (activity 222). In an embodiment, a seller may set a general real-time contact schedule or a real-time contact schedule specific to the item to be shown on the view item page.

Figure 7:
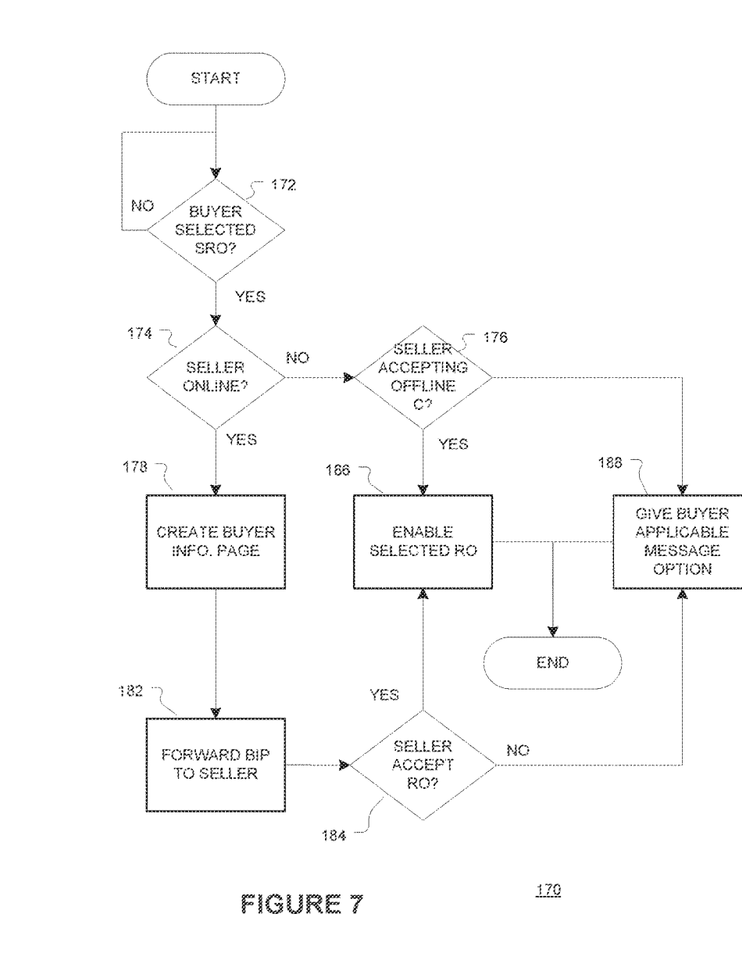
FIG. 7 is a flow diagram illustrating several methods according to various embodiments.

FIG. 7 is a flow diagram of a buyer item real-time contact request method 170 according to various embodiments. In an embodiment, when a buyer via a buyer device 42 interface 44 selects a real-time contact option on an item page (activity 172), the method 170 may determine whether the seller device 32 interface 34 is active (seller online) (activity 174). In an embodiment, when the method 170 determines a seller is not online, the method 170 may determine whether the seller is accepting the requested real-time contact option offline (activity 176). The seller via a seller general setup page 64 or sell item page 74 (or revise item page), may specify one or more rules for various real-time-contact options. In an embodiment, when the requested real-time contact option is for voice contact, a seller may specify one or more telephone numbers to used to establish voice communication when the seller is offline or online.

When the seller has specified an offline setup for the selected seller real-time contact option, the method 170 may enable the selected real-time contact option via the seller specified setup (activity 186). The seller via a seller device 32 may specify message options when the seller is offline or does not answer or accept a seller real-time contact option. When the seller has not specified an offline setup for the selected real-time contact option or has elected not to accept the selected real-time contact option offline, the method 170 may give the buyer (via the buyer device 32 or buyer device telephone 36) a message option (activity 188) specified by a seller for such an real-time contact option request.

When the seller is online (seller device 32 interface 34 is active), the method 170 may generate a real-time contact request page (RRP) 82 (activity 178). In an embodiment, the real-time contact request page 82 may include information about the buyer and item associated with the selected contact option. The buyer information may include a unique buyer identifier, history of past contact attempts by the buyer, history of past sales between the buyer and seller, buyer bid or purchase status for the related item, and buyer general sales history/rating/creditability. The item information may include the item bid or sales status, unique item identifier, item description, and item multimedia (including pictures or video). The method 170 may forward the buyer information page (in the RRP 82 in an embodiment) to the seller's seller device 32 interface 34 (activity 184).

In an embodiment, when the seller via a seller device 32 accepts the requested seller real-time contact option, the method 170 may enable the requested real-time contact option (activities 184, 186). The method 170 may engage the publication device 22 server 24 or a voice communication provider 52 to enable or request enablement of the requested and accepted seller real-time contact option. In an embodiment, when the seller via a seller device 32 does not accept the requested seller real-time contact option, the method 170 may give the buyer (via the buyer device 32 or buyer device telephone 36) a message option specified by a seller for such an real-time contact option request (activities 184, 188).

Figure 8:
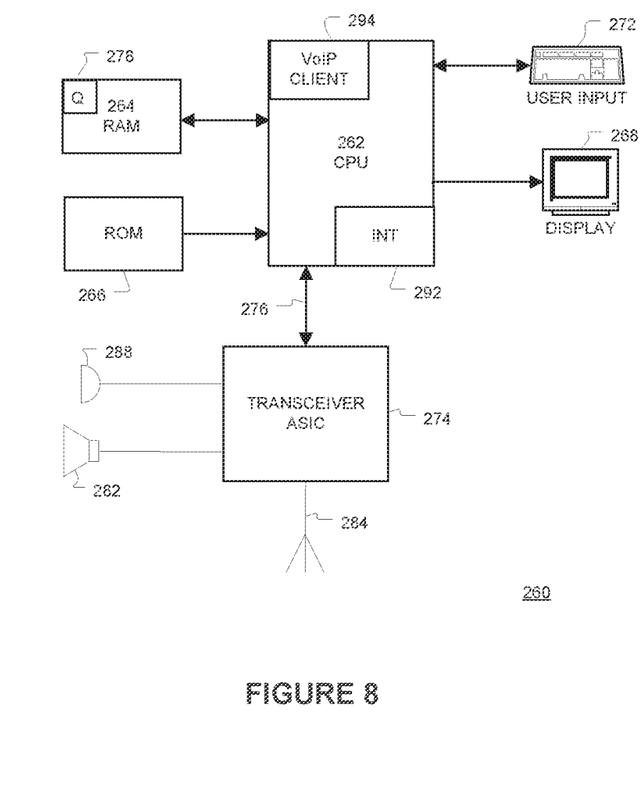
FIG. 8 is a block diagram of an article according to various embodiments.

A device 260 is shown in FIG. 8 that may be used in various embodiments as a buyer device 42 or seller device 32. The device 60 may include a central processing unit (CPU) 262, a random access memory (RAM) 264, a read only memory (ROM") 266, a display 268, a user input device 272, a transceiver application specific integrated circuit (ASIC) 274, a microphone 288, a speaker 282, and an antenna 284. The CPU 262 may include a VoIP client 294 and a publication device 22 message interpreter 292. The RAM 264 may include a queue 278 where the queue 278 may store publication device 22 messages. The interpreter 292 and the VoIP client 294 may be separate elements. The VoIP client 294 may enable VoIP sessions between a VoIP server and itself, or between another VoIP client and itself. The interpreter 292 may process messages or pages from and generate messages or pages for the publication device 22 server 24.

The ROM 266 is coupled to the CPU 262 and may store the program instructions to be executed by the CPU 262, VoIP client 294, and interpreter 292. The RAM 264 is coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear received messages or pages from the publication device 22 server 24.

The microphone 288 and speaker 282 may be incorporated into the device 260. The microphone 288 and speaker 282 may also be separated from the device 260. Received data may be transmitted to the CPU 262 via a serial bus 276 where the data may include messages or pages received, messages or pages to be transmitted, or protocol information. The transceiver ASIC 274 may include an instruction set necessary to communicate messages or pages in architecture 10. The ASIC 274 may be coupled to the antenna 284 to communicate wireless messages or pages within the architecture 10. When a message is received by the transceiver ASIC 274, its corresponding data may be transferred to the CPU 262 via the serial bus 276. The data can include wireless protocol, overhead information, and pages to be processed by the device 260 in accordance with the methods described herein.

Figure 9:
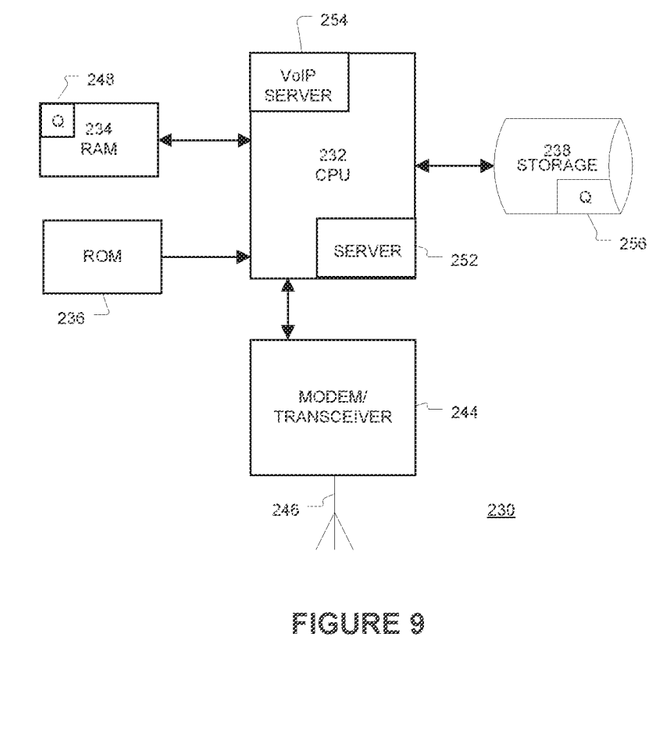
FIG. 9 is a block diagram of an article according to various embodiments.

FIG. 9 illustrates a block diagram of a device 230 that may be employed as a publication device 22 in various embodiments. The device 230 may include a CPU 232, a RAM 234, a ROM 236, a storage unit 238, a modem/transceiver 244, and an antenna 246. The CPU 232 may include a VoIP server 254 and a server 252. The RAM 234 may include a queue or database 248 where the queue 248 may be used to store buyer or seller information including general information, contact configuration, sales history, and item information. The storage 238 may also include a queue or database 256 where the queue 256 may be used to store may be used to store buyer or seller information including general information, contact configuration, sales history, and item information. The VoIP server 254 and the server 252 may be separate elements.

In an embodiment, the VoIP server 254 may initiate and maintain VoIP sessions between a buyer device 42 or a buyer telephone 46 and a seller device 32 or a seller telephone 36. In an embodiment, the VoIP server 254 may be maintained and operated a third party VoIP provider including Skype™. In an embodiment, the server 252 may be a publication server 24 including the modules shown in FIG. 3.

The modem/transceiver 244 may couple, in a well-known manner, the device 230 to the network 14 or POTS to enable communication with the seller device 32, buyer device 42, and voice communication provider 52. In an embodiment, the modem/transceiver 244 may be a wireless modem or other communication device that may enable communication with the seller device 32, buyer device 42, or voice communication provider 52. The CPU 232 via the server 252 may direct communication between modem 244 and the seller device 32, buyer device 42, or voice communication provider 52.

The ROM 236 may store program instructions to be executed by the CPU 232, VoIP server 254, or server 252. The RAM 234 may be used to store temporary program information, queues, databases, and overhead information. The storage device 238 may comprise any convenient form of data storage and may be used to store temporary program information, queues, databases, and overhead information.

Any of the components previously described can be implemented in a number of ways, including embodiments in software. Any of the components previously described can be implemented in a number of ways, including embodiments in software. Thus, the CPU 232, VoIP server 254, server 252, modem/transceiver 2444, antenna 246, storage 238, RAM 234, ROM 236, queue 248, queue 256, CPU 262, interpreter 292, VoIP client 294, transceiver ASIC 274, antenna 284, microphone 288, speaker 282, ROM 266, RAM 264, queue 278, user input 272, display 268, publication device 22, seller device 32, buyer device 42, and voice communication provider 52 may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method comprising:
   identifying a number of real-time communications for each of a plurality of real-time contact types conducted by a first user in a predetermined time interval, the plurality of real-time contact types including voice and instant message;
   determining, by a hardware processor, whether the number of real-time communications exceeds a predetermined limit for each of the plurality of real-time contact types, the predetermined limit varying as a function of the real-time contact type;
   based on the number of real-time communications exceeding the predetermined limit for a first type of the real-time contact types and not exceeding the predetermined limit for a second type of the real-time contact types, preventing presentation, to a device of the first user, of a real-time communications option for the first type on a web page or a mobile application while-causing presentation, to the device of the first user, of the real-time communications option for the second type on the web page or the mobile application, a selection of the real-time communication option for the second type triggering an attempt to contact an active second user using the second type.

2. The method of claim 1, wherein the predetermined limit is based on a number of real-time voice communications.

3. The method of claim 1, wherein the predetermined limit is based on a number of real-time instant messaging communications.

4. The method of claim 1, further comprising:
receiving a selection of the real-time communications option for the second type from the first user;
in response to receiving the selection, transmitting a communication to a device of a second user indicating a request for real-time communications; and
in response to an acceptance of the request, causing the real-time communications to occur between the first user and the second user.

5. The method of claim 1, further comprising:
receiving a selection of the real-time communications option for the second type from the first user;
in response to receiving the selection, transmitting a communication to a device of a second user indicating a request for real-time communications;
receiving a response to the request from the second user; and
transmitting a notification of the response to the device of the first user.

6. The method of claim 1, further comprising:
receiving a selection of the real-time communications option for the second type from the first user;
in response to receiving the selection, transmitting a communication to a device of a second user indicating a request for real-time communications;
determining that the second user has not responded to the request within a predetermined time period; and
generating and transmitting a declination reply in response to the second user not responding to the request within the predetermined time period.

7. The method of claim 1, further comprising:
in response to determining that the second user is not active, providing a message option to the first user.

8. A system comprising:
one or more hardware processors; and
a memory storing instructions that, when executed by the one or more hardware processors, cause the one or more hardware processors to perform operations comprising:
identifying a number of real-time communications for each of a plurality of real-time contact types conducted by a first user in a predetermined time interval, the plurality of real-time contact types including voice and instant message;
determining whether the number of real-time communications exceeds a predetermined limit for each of the plurality of real-time contact types, the predetermined limit varying as a function of the real-time contact type;
based on the number of real-time communications exceeding the predetermined limit for a first type of the real-time contact types and not exceeding the predetermined limit for a second type of the real-time contact types, preventing presentation, to a device of the first user, of a real-time communications option for the first type on a web page or a mobile application while causing presentation, to the device of the first user, of the real-time communications option for the second type on the web page or the mobile application, a selection of the real-time communication option for the second type triggering an attempt to contact an active second user using the second type.

9. The system of claim 8, wherein the predetermined limit is based on a number of real-time voice communications.

10. The system of claim 8, wherein the predetermined limit is based on a number of real-time instant messaging communications.

11. The system of claim 8, wherein the operations further comprise:
receiving a selection of the real-time communications option for the second type from the first user;
in response to receiving the selection, transmitting a communication to a device of a second user indicating a request for real-time communications; and
in response to an acceptance of the request, causing the real-time communications to occur between the first user and the second user.

12. The system of claim 8, wherein the operations further comprise:
receiving a selection of the real-time communications option for the second type from the first user;
in response to the selection, transmitting a communication to a device of a second user indicating a request for real-time communications;
receiving a response to the request from the second user; and
transmitting a notification of the response to the device of the first user.

13. The system of claim 8, wherein the operations further comprise:
receiving a selection of the real-time communications option for the second type from the first user;
in response to receiving the selection, transmitting a communication to a device of a second user indicating a request for real-time communications;
determining that the second user has not responded to the request within a predetermined time period; and
generating and transmitting a declination reply in response to the second user not responding to the request within the predetermined time period.

14. The system of claim 8, wherein the operations further comprise:
in response to determining that the second user is not active, providing a message option to the first user.

15. A non-transitory machine-readable medium comprising instructions, which when executed by one or more processors of a machine, cause the machine to perform operations comprising:
identifying a number of real-time communications for each of a plurality of real-time contact types conducted by a first user in a predetermined time interval, the plurality of real-time contact types including voice and instant message;
determining whether the number of real-time communications exceeds a predetermined limit for each of the plurality of real-time contact types, the predetermined limit varying as a function of the real-time contact type;
based on the number of real-time communications exceeding the predetermined limit for a first type of the real-time contact types and not exceeding the predetermined limit for a second type of the real-time contact types, preventing presentation, to a device of the first user, of a real-time communications option for the first type on a web page or a mobile application while causing presentation, to the device of the first user, of the real-time communications option for the second type on the web page or the mobile application, a selection of the real-time communication option for the second type triggering an attempt to contact an active second user using the second type.

16. The non-transitory machine-readable medium of claim 15, wherein the predetermined limit is based on a number of real-time voice communications.

17. The non-transitory machine-readable medium of claim 15, wherein the predetermined limit is based on a number of real-time instant messaging communications.

18. The non-transitory machine-readable medium of claim 15, wherein the operations further comprise:
    receiving a selection of the real-time communications option for the second type from the first user; and
    in response to receiving the selection, transmitting a communication to a device of a second user indicating a request for real-time communications.

* * * * *